United States Patent [19]
Kemnitzer

[11] 3,849,912
[45] Nov. 26, 1974

[54] EDUCATIONAL TOY
[76] Inventor: Ronald Kemnitzer, 1732 Cambria Dr., East Lansing, Mich. 48823
[22] Filed: Oct. 10, 1973
[21] Appl. No.: 405,168

[52] U.S. Cl............................ 35/28.3, 35/27, 35/34, 46/16
[51] Int. Cl. .............................................. G09b 1/10
[58] Field of Search ........ 35/34, 27, 28, 28.3, 22 A, 35/24 A, 41; 46/16; 273/100, 157 A, 130 A, 131 A; 40/133 R, 106.1

[56] References Cited
UNITED STATES PATENTS

| | | | |
|---|---|---|---|
| 1,419,871 | 6/1922 | McDonald | 273/100 UX |
| 3,365,816 | 1/1968 | Singerman | 35/28.3 |
| 3,438,702 | 4/1969 | Milhaupt | 40/106.1 X |
| 3,625,149 | 12/1971 | Allen | 35/27 X |
| 3,761,094 | 9/1973 | Belisle | 273/100 X |

FOREIGN PATENTS OR APPLICATIONS
60,919   8/1954   France .................................. 46/16

*Primary Examiner*—Harland S. Skogquist
*Attorney, Agent, or Firm*—Kinzer, Plyer, Dorn & McEachran

[57] ABSTRACT

An educational toy useful for teaching color mixing, shape identity, and the concept of sequency, utilizes an illuminated surface with protruding ordered dowels upon which a variety of playing pieces of different colors and geometrical shapes can be arranged so that the pieces overlap each other, providing visual color mixing, color matching, sequence, shape matching, and like activities to the user.

8 Claims, 9 Drawing Figures

PATENTED NOV 26 1974   3,849,912

EDUCATIONAL TOY

BACKGROUND OF THE INVENTION

This invention relates generally to educational toys and more particularly concerns a toy which can teach color mixing, shape identity, and the concept of sequence.

The concept of toys has changed gradually from that of merely occupying a child's time to that of educating a child. An educational toy while occupying a child's time provides stimuli to a child's mind and helps the child to learn specific concepts. The present educational toy includes an illuminated surface and colored pieces which serve as sort of a TV screen that the child can control. The illuminated surface enhances the color mixing and serves as an attention getter. Moreover, the toy lends itself to use as a game whereby children have to provide certain colors by mixing others.

An object of the invention is to provide an educational toy which will teach color mixing to a user.

Another object is to provide a toy which will teach shape identity to a child.

A third object is to provide an educational toy which will teach the concept of sequence to a child.

SUMMARY OF THE INVENTION

In accordance with the invention an educational toy for teaching color mixing and color identity includes an illuminated surface which is at least partially transparent, a plurality of ordered dowels projecting from said illuminated surface, a lighting means which illuminates the illuminated surface from a side opposite the dowels, and a plurality of at least partially transparent playing pieces of assorted colors and geometric shapes, each piece including at least one alignment means so that the pieces can be aligned upon the ordered dowels in an intelligible manner, the pieces being capable of overlapping one another.

DETAILED DESCRIPTION OF THE INVENTION

Figure 1:
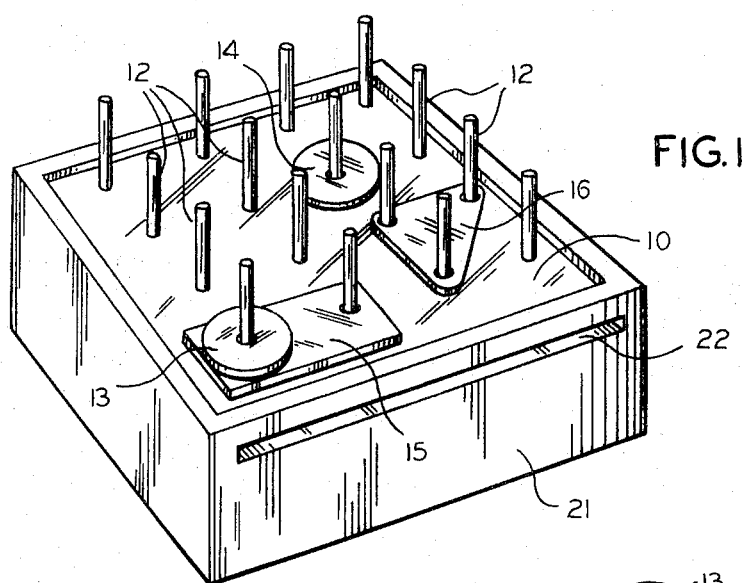
FIG. 1 is a perspective view of an educational toy constructed in accordance with one embodiment of the present invention.
Figure 3:
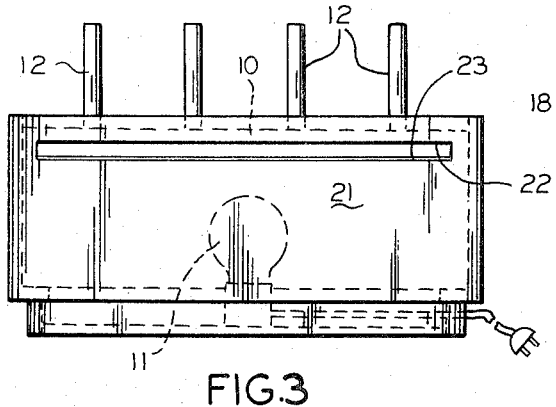
FIG. 3 is a front elevation view of the toy.

FIG. 1 shows an illuminated surface 10 which is at least partially transparent, preferably translucent, so that a lighting means 11 as seen in FIG. 3 will be capable of transmitting light through the surface 10. Projecting from the side of the surface 10 opposite the lighting means 11 are a set of ordered dowels 12. These dowels are at least partially transparent and preferably are clear or transparent. Dowels 12 are arranged in a manner so that they are capable of accepting playing pieces 13, 14, 15 and 16 in a variety of positions between the ordered dowels.

Figure 4:
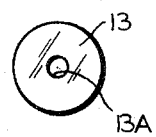
FIG. 4 is a plan view of a playing piece for the present invention.

The playing pieces, which are at least partially transparent, are shown in a variety of geometric shapes in FIGS. 4-9. However, these shapes are not intended to be all inclusive and any geometrical shape which is desired to be taught to a child would be acceptable. Thus, FIG. 4 shows a circular piece 13 with an alignment means 13A. The alignment means in this instance is a hole which is large enough so that it can easily be slipped over a dowel 12. This piece and the other pieces are of a size so that they are easy for a small child to pick up and manipulate; the hole 13A has a generous size so that it easily accomodates the dowel 12. Thus, the difficulty of putting the pieces onto the dowels is low, which encourages the success of the child and builds confidence.

Figure 5:
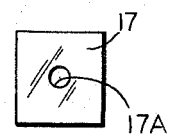
FIG. 5 is a plan view of another piece for the present invention.
Figure 6:
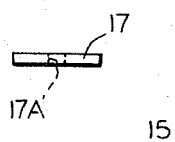
FIG. 6 is an elevation of the piece of FIG. 5.
Figure 7:
FIGS. 7-9 are plan views of other playing pieces for use with the invention.

FIG. 5 shows a square playing piece 17 with an alignment hole 17A. FIG. 6 shows a front view of piece 17 and how the aligning hole 17A extends through the center of the piece. The thickness of the piece 17 may be varied as desired. Preferably, however, the playing pieces are formed of clear, rigid, strong plastic at least one-eighth inch thick, so that they cannot be readily folded or broken by a child. The dowels 12 should each have a height many times greater than the thickness of an individual playing piece. FIG. 7 shows a rectangular piece 15 with its alignment holes 15A and 15B. Whereas pieces 13 and 17 had only one alignment hole and could be placed on any single dowel 12, the rectangular piece 15 has two alignment holes 15A and 15B so that it can be placed on any pair of dowels 12. While this particular rectangular piece 15 has two aligning means, a larger rectangular playing piece might have more or a smaller rectangular piece might only have one.

Figure 8:
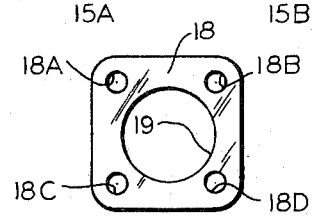

FIG. 8 shows a square piece 18 with a large circular hole 19 cut out of its center. Piece 18 also includes four aligning holes 18A, 18B, 18C and 18D. These aligning holes will fit over four adjacent dowels in a square pattern. Thus, it is apparent that the dowels 12 are ordered so that the playing pieces with their aligning means can allow each piece to be fitted or arranged between the dowels in many positions. Hole 19 can be made slightly larger than a circular playing piece such as 13 so that piece 13 can be positioned inside the hole 19. This interfitting arrangement can be used with pieces of any desired shape.

Figure 9:
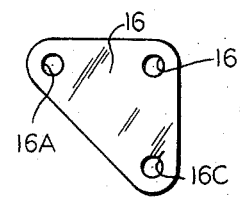

FIG. 9 shows a triangular piece 16 with three alignment means comprising holes 16A, 16B and 16C. Again the three alignment means are designed so that the piece can be placed over a group of three adjacent dowels in a triangular shape.

While the pieces shown are some basic geometric shapes, other shapes can also be utilized. The pieces can be made larger or smaller as desired; for example, a large square could fit over nine dowels and have accordingly nine aligning means. The aligning means do not necessarily have to be holes. They can be indentations, for example, in the corners of a square; for a circular piece, there could be two indentations at the ends of a diameter so that the circular piece would fit between two of the dowels. Other modes of alignment will be apparent to those skilled in the art.

An important feature of the invention is that the pieces are at least partially transparent: being translucent, transparent, opaque with translucent or transparent areas, or any combination of these. Thus, light will be transmitted through the pieces so as to be viewable by the user.

Another important feature of the invention is that the pieces are made in a variety of colors. A preferred array of colors is that of the primary colors. Thus, if the three primary colors are used and two different color pieces overlap they form the complement of the third color. Of course, more than two pieces can be overlapped and the only limitation on the number of pieces to be overlapped is an adequate height of the dowels 12 and an adequate transmission of light through the pieces.

Another feature of the invention includes a base 21 with a slot carrier 22 between the illuminated surface 10 and the lighting means 11. The slot carrier is capable of receiving a sheet 23 which lies under the illuminated surface 10, between the surface 10 and the light source 11. The sheets 23 are preferably at least partially transparent and can be made of a variety of colors, providing a different color for the illuminated surface as desired. Of course, the sheets may be more than one color.

Figure 2:
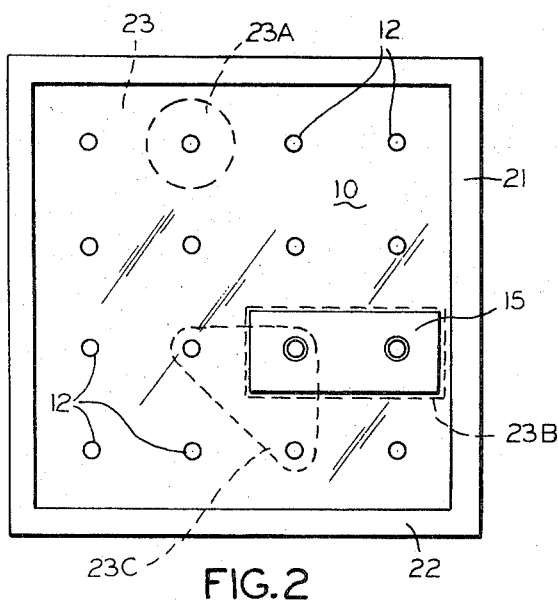
FIG. 2 is a plan view of the toy.

FIG. 2 shows a sheet 23 which is marked with different patterns 23A, 23B, and 23C. Pattern 23A corresponds in shape and size to piece 13 or piece 14; pattern 23B corresponds in shape and size to piece 15; and, pattern 23C corresponds in shape and size to piece 16. Thus a method of teaching can be used whereby the child is instructed to put similarly shaped pieces on the dowels in the manner suggested by the patterns. This requires the child to identify the shapes and to properly align the pieces on the illuminated surface. Moreover patterns 23A, 23B and 23C can be provided in a particular color while the other portion of sheet 24 can be clear or of a different color, in which case the child must not only choose the proper shape but also the proper color.

Thus, the pieces can be stacked and arranged on the dowels in either abstract manners or in a predetermined arrangement. The pieces are designed to overlap each other so that when different color pieces are stacked upon each other or overlapped a color change is created. Thus, the child can learn color mixing and matching automatically even though he may only be interested in shape.

When many pieces are stacked upon several dowels so that they overlap with those on the other dowels, the concept of sequence is introduced to the child. This forces the child to plan his actions in advance in order to successfully remove such pieces.

The color mixing, shape identity, or sequence concepts of the pieces on the illuminated surface can be used in a structured game situation in which any or all of these concepts is part of a game. The game situations can be structured to teach the children shapes, colors, sequence, or any combination. The sheet 23 may have associated patterns and associated color or shape changes to provide a game board for use in any of these structured games.

Thus the objects of the invention have been satisfied by a device which can make learning a delightful experience for children.

I claim:

1. An educational toy for teaching color mixing, shape identity, and sequence comprising:
    an illuminated surface which is at least partially transparent;
    a plurality of ordered dowels projecting from said illuminated surface;
    a lighting means which illuminates said illuminated surface from the side opposite said dowels; and,
    a plurality of at least partially transparent playing pieces of assorted colors and geometric shapes, each piece including at least one alignment means so that the piece can be aligned upon said ordered dowels in an intelligible manner, said pieces being capable of overlapping one another.

2. An educational toy as in claim 1 which includes:
    a base including a slot carrier between said illuminated surface and said lighting means, and capable of receiving different sheets which are viewable through said illuminated surface by a user; and,
    at least one sheet which is capable of being placed in said slot carrier.

3. An educational toy as in claim 2 wherein said sheets are at least partially transparent and are of different colors.

4. An educational toy as in claim 2 wherein said sheets are marked with different patterns related to the shapes of the playing pieces to indicate a required pattern for placement of playing pieces on said ordered dowels.

5. An educational toy as in claim 2 wherein said colors constitute the primary colors.

6. An educational toy as in claim 2 wherein said geometric shapes include squares, rectangles, triangles and circles.

7. An educational toy as in claim 1 in which each playing piece is formed of rigid, relatively thick plastic material.

8. An educational toy as in claim 7 in which each dowel is formed of transparent plastic material and has a height many times greater than the thickness of an individual playing piece.

* * * * *